(12) United States Patent
Shibahara

(10) Patent No.: US 7,248,328 B1
(45) Date of Patent: Jul. 24, 2007

(54) LIQUID CRYSTAL DISPLAY PANEL WITH WIDE COLUMN SPACERS FOR KEEPING GAP CONSTANT AND PROCESS FOR FABRICATION THEREOF

(75) Inventor: Hideo Shibahara, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 179 days.

(21) Appl. No.: 09/689,114

(22) Filed: Oct. 12, 2000

(30) Foreign Application Priority Data

Oct. 15, 1999 (JP) .............................. 11-293794

(51) Int. Cl.
G02F 1/1339 (2006.01)
G02F 1/1343 (2006.01)
G02F 1/1341 (2006.01)

(52) U.S. Cl. .................. 349/155; 349/141; 349/153; 349/154; 349/189

(58) Field of Classification Search ................ 349/155, 349/106, 110, 153, 166, 156, 157, 154, 189
See application file for complete search history.

(56) References Cited

U.S. PATENT DOCUMENTS

| | | | |
|---|---|---|---|
| 5,016,987 A * | 5/1991 | Smith, Jr. .................. 349/153 |
| 5,729,312 A | 3/1998 | Yamagishi et al. |
| 5,739,888 A * | 4/1998 | Ogura et al. .................. 349/153 |
| 5,757,451 A | 5/1998 | Miyazaki et al. |
| 5,953,087 A * | 9/1999 | Hoyt ............................ 349/58 |
| 6,010,384 A * | 1/2000 | Nishino et al. ............... 445/24 |
| 6,067,144 A * | 5/2000 | Murouchi .................... 349/156 |
| 6,122,033 A * | 9/2000 | Mathew et al. ............. 349/155 |
| 6,211,937 B1* | 4/2001 | Miyachi et al. ............. 349/156 |
| 6,275,280 B1* | 8/2001 | Kajita et al. ................ 349/155 |
| 6,281,960 B1* | 8/2001 | Kishimoto et al. ......... 349/156 |
| 6,288,766 B1* | 9/2001 | Mashiko et al. ............ 349/189 |
| 6,317,188 B1* | 11/2001 | Shibahara ................... 349/155 |
| 6,414,733 B1* | 7/2002 | Ishikawa et al. ............ 349/110 |

FOREIGN PATENT DOCUMENTS

| | | |
|---|---|---|
| JP | 05-019267 | 1/1993 |
| JP | 10-048636 | 2/1998 |
| JP | 10-082909 | 3/1998 |
| JP | 10-104606 | 4/1998 |
| JP | 10-268327 | 10/1998 |

* cited by examiner

*Primary Examiner*—David Nelms
*Assistant Examiner*—Michael H. Caley
(74) *Attorney, Agent, or Firm*—Katten Muchin Rosenman LLP

(57) ABSTRACT

An IPS (In-Plane-Switching) liquid crystal display panel has column spacers for spacing an active matrix substrate structure from a counter substrate structure, and liquid crystal fills the gap therebetween, wherein the ratio of total contact area between the column spacers and the active matrix substrate structure to the total area occupied by the pixels is fallen within the range from 0.050 percent to 0.150 percent so as to prevent the liquid crystal display panel from irregularity of brightness by keeping the gap constant.

19 Claims, 12 Drawing Sheets

LIQUID CRYSTAL DISPLAY PANEL WITH WIDE COLUMN SPACERS FOR KEEPING GAP CONSTANT AND PROCESS FOR FABRICATION THEREOF

FIELD OF THE INVENTION

This invention relates to a liquid crystal display panel and, more particularly, to a liquid crystal display panel having substrate structures spaced from one another by spacers and a process for fabricating the liquid crystal display panel.

DESCRIPTION OF THE RELATED ART

The liquid crystal display panel is light, thin and low in electric power consumption, and is used as terminals of various information systems as well as an image reproducing system. The liquid crystal display panel includes a pair of substrate structures and liquid crystal filling the gap between the substrate structures. Twisted nematic liquid crystal and super twisted nematic liquid crystal are typical examples of the liquid crystal available for the liquid crystal display panel. The liquid crystal molecules change the tilt angle depending upon the strength of electric field applied across the liquid crystal layer. The liquid crystal display panel is virtually divided into pixels, and, accordingly, the pixels respectively contain pieces of liquid crystal. A driver circuit selectively changes the tilt angles and, accordingly, transmittance of the pieces of liquid crystal so as to produce an image on the pixels. However, the image is dependent on the tilt angle of the pieces of liquid crystal. If an observer stands oblique with respect to a normal line of the liquid crystal display panel, the light reaches the observer through other pieces of liquid crystal, and the image is destroyed. Thus, the liquid crystal display panel suffers from a narrow viewing angle.

In order to improve the viewing angle, an IPS (In-Plane-Switching) technology has been proposed. FIGS. 1 and 2 show a prior art liquid crystal display panel where the IPS technology is employed. As will be seen in FIG. 2, the prior art liquid crystal display panel is broken down into an active matrix substrate structure 6, a counter substrate structure 13, liquid crystal 10 and a sealing layer 23. The active matrix substrate structure 6 is opposed to the counter substrate structure 13, and the liquid crystal 10 is sealed between the gap between the active matrix substrate structure 6 and the counter substrate structure 6 by means of the sealing layer 23. Spherical spacers 22 reinforce the sealing layer 23. Electric field is laterally created, and is applied to the liquid crystal molecules 10.

The active matrix substrate structure 6 includes a transparent insulating substrate 6a, a polarizing plate 19, scanning signal lines 1, data signal lines 5 (see FIG. 1), thin film transistors 18 (see FIG. 1), a common electrode 2 (see FIG. 1), pixel electrodes 3 (see FIG. 1), an overcoat layer 8 and an orientation layer 9. The polarizing plate 19 is attached to the outer surface of the transparent insulating substrate 6a, and the scanning signal lines 1 and the common electrodes 2 are patterned on the inner surface of the transparent insulating substrate 6a. Parts of the scanning signal lines 1 serve as gate electrodes of the thin film transistors 18, and the scanning signal lines 1 are electrically isolated from the common electrodes 2.

The scanning lines 1 and the common electrodes 2 are covered with a gate insulating layer 7 which is shared between the thin film transistors 18. The data signal lines 5 are patterned on the gate insulating layer 7. Semiconductor layers, source and drain electrodes of the thin film transistors 18 and the pixel electrodes 3 are further patterned on the gate insulating layer 7. The source electrodes are selectively connected to the data signal lines 5, and the drain electrodes are connected to the associated pixel electrodes 3. The source electrodes are respectively held in contact with the associated semiconductor layers. The drain electrodes are respectively held in contact with the associated semiconductor layers, and are spaced from the associated source electrodes. Thus, the gate electrode, the gate insulating layer 7, the source electrode, the drain electrode and the semiconductor layer form in combination the thin film transistor 18.

The data signal lines 5, the source electrodes, the semiconductor layers, the drain electrodes and the pixel electrodes 3 are covered with a protective insulating layer 8, and the orientation layer 9 is laminated on the protective insulating layer 7. The orientation layer 9 is rubbed at θ1 degrees with respect to a direction θ3 of lines of electric force (see FIG. 3) in the electric field created between the pixel electrode 3 and the common electrode 2. The lines of electric force are substantially perpendicular to the longitudinal direction of the pixel/common electrodes 2/3.

On the other hand, the counter substrate structure 13 includes a transparent insulating substrate 13a, a polarizing plate 19, color filters 14/15/16, a black matrix 17, an overcoat layer 11 and an orientation layer 9. The polarizing plate 19 is attached to the outer surface of the transparent insulating substrate 13a. One of the polarizing plates 19 has the transmitting direction of polarized light inclined from the direction θ3 at θ1 (see FIG. 3), and the transmitting direction of the other polarizing plate 19 is inclined from the direction θ3 at θ2. Thus, the transmitting directions of polarized light cross with each other at 90 degrees.

The color filters and the black matrix 17 are patterned on the inner surface of the transparent insulating substrate 13a. The black matrix 17 is covered with the color filters 14, 15 and 16, and the color filters 14, 15, and 16 are colored in red, blue and green, respectively. Parts of the color filters 14, 15 and 16 under the black matrix 17 are overlapped. The black matrix 17 and the color filters 14/15/16 are covered with the overcoat layer 11, and the orientation layer 9 is attached to the overcoat layer 11. The parts of the color filters 14/15/16 are also covered with the overcoat layer 11 and the orientation layer 9, and the parts of the color filters 14/15/16, the part of the overcoat layer 11 and the part of the orientation layer 9 form in combination each column spacer 21. The column spacers 21 are held in contact with the active matrix substrate structure 6, and keep the gap between the active matrix substrate structure 6 and the counter substrate structure 13 constant.

The prior art liquid crystal display panel behaves as follows. Assuming now that the thin film transistor 18 associated with a pixel is turned off, the video signal on the associated data signal line 5 does not pass through the thin film transistor 18, nor reaches the associated pixel electrode 3. In this situation, the liquid crystal molecules LC have the longitudinal directions in parallel to the transmitting direction of polarized light inclined from the direction θ3 at θ1. Incident light is linearly polarized through the polarizing plate 19 of the active matrix substrate structure 6 in such a manner as to have the transmitting direction of polarized light inclined from the direction θ3 at θ1. For this reason, the linearly polarized light passes through the liquid crystal molecules LC, and reaches the other polarizing plate 19 of the counter substrate structure 13. However, the polarizing plate 19 of the counter substrate structure 13 has the transmitting direction of polarized light inclined from the direction θ3 at θ2, and the linearly polarized light can not pass the polarizing plate 19 of the counter substrate structure 13. This means that the pixel is dark.

On the other hand, when the data signal reaches the pixel electrode 33 through the thin film transistor 18, the electric field between the pixel electrode 3 and the common electrode 2 forces the liquid crystal molecules LC to have the longitudinal directions in perpendicular to the pixel/common electrodes 3/2 as shown in FIG. 4B. The incident light is linearly polarized by the polarizing plate 19 of the active matrix substrate structure 6. While the linearly polarized light is passing the liquid crystal 19, the linearly polarized light is converted to elliptically polarized light due to the double refraction. The elliptically polarized light passes through the polarizing plate 19 of the counter substrate structure 13, and makes the pixel bright.

In order to produce an image on the prior art liquid crystal display panel, the scanning signals are selectively supplied through the scanning lines 1 to the gate electrodes of the associated thin film transistors 18 so as to cause the associated thin film transistors 18 turn on, and the data signals are selectively supplied to the data signal lines 5. The data signals pass through the thin film transistors 18 in the on-state, and reach the associated pixel electrodes 3. Thus, the pixels are selectively changed to be transparent, and the image is produced.

Another prior art liquid crystal display panel is known as an active matrix type liquid crystal display panel. The prior art standard active matrix type liquid crystal display panel includes an active matrix substrate structure, a counter substrate structure and liquid crystal filling the gap between the active matrix substrate structure and the counter substrate structure spaced from one another by means of a sealing layer. In this instance, the thin film transistors, the black matrix and the color filters are fabricated on the active matrix substrate structure, and the common electrode is formed on the counter electrode. The thin film transistors may be replaced with diodes or varistors.

In order to keep the gap between the active matrix substrate structure and the counter substrate structure constant, spherical spacers, glass fiber spacers or column spacers are provided between the active matrix substrate structure and the counter substrate structure. The spherical spacers are scattered on the inner surface of either substrate structure at random. For this reason, the manufacturer can not prevent the pixels from the spherical spacers. The spherical spacers on the pixels are causative of undesirable light scattering and/or degradation of an image produced on the panel. Moreover, the spherical spacers are liable to break the pixel electrodes and the orientation layer, and the liquid crystal is contaminated due to the particles of the pixel electrodes/orientation layers. The glass fiber spacers are also scattered on the inner surface of either substrate structure, and the same problems are encountered in the prior art liquid crystal display panel.

On the other hand, the column spacers are produced through the photolithography, and the column spacers are exactly assigned to appropriate locations. The column spacers are disclosed in Japanese Patent No. 2751392 and Japanese Patent Publication of Unexamined Application Nos. 10-104606 and 10-82909.

The column spacers disclosed in Japanese Patent No. 2751392 and Japanese Patent Publication of Unexamined Application No. 10-104606 have a laminated structure. The color filters are partially laminated so as to form the column spacers. These column spacers are close to the column spacer 21 shown in FIG. 1. On the other hand, the column spacers disclosed in Japanese Patent Publication of Unexamined Application No. 10-82909 is patterned from an overcoat layer.

The prior art column spacers disclosed in Japanese Patent No. 2751392 and Japanese Patent Publication of Unexamined Application No. 10-104606 do not require any additional step. The production cost is not increased. The prior art spacers disclosed in Japanese Patent Publication of Unexamined Application No. 10-82909 requires a patterning step, and the production cost is increased.

The prior art standard active matrix liquid crystal display panel have the common electrode on the counter substrate structure and the pixel electrodes on the active matrix substrate structure, and the column spacers are usually formed on the active matrix substrate structure. Transparent electrodes are formed on the top surfaces of the column spacers. In order to prevent the common electrode from short-circuit to the transparent electrodes, insulating layers are required. Otherwise, the column spacers are to be formed on narrow areas or located in an area where the short-circuit is negligible. Thus, there area many problems in the application of the column spacers to the standard active matrix liquid crystal display panel. Moreover, the viewing angle of the standard active matrix liquid crystal display panel is narrower than that of the IPS liquid crystal display panel.

On the other hand, the IPS liquid crystal display panel is free from the limits on the standard active matrix liquid crystal display panel, and achieves a wide viewing angle. Thus, the IPS liquid crystal display panel has many attractive points.

However, a problem is encountered in the prior art IPS liquid crystal display panel in that the visual image partially whitens along the lower edge line of the liquid crystal display panel.

SUMMARY OF THE INVENTION

It is therefore an important object of the present invention to provide a liquid crystal display panel, which does not partially whiten a visual image.

It is also an important object of the present invention to provide a process for fabricating the liquid crystal display panel free from the partially whitened visual image.

The present inventor contemplated the problem inherent in the prior art liquid crystal display panel, and noticed that the partially whitened visual image was produced at high environmental temperature when the liquid crystal display panel was vertically placed on a surface. The present inventor measured the gap between the active matrix substrate structure and the counter substrate structure, and found that the gap was increased along the lower edge of the display panel. When the liquid crystal display panel was in a high environmental temperature, surface tension between the liquid crystal and the orientation layers was decreased, and tended to make a descent due to the gravity exerted thereon. This resulted in the increase of the gap along the lower edge of the display panel. The thick liquid crystal along the lower edge made the visual image partially whitened.

In accordance with one aspect of the present invention, there is provided a liquid crystal display panel comprising a pair of substrate structures having plural pixels where an image is produced, liquid crystal filling a gap between the substrate structures of the pair and selectively making the pixels dark and bright for producing the image and column spacers formed on one of the substrate structures of the pair and held in contact with the other of the substrate structures, the ratio of the total contact area between the column spacers and the other of the substrate structures to the total area occupied by the plural pixels being fallen within the range from 0.050 percent to 0.150 percent.

In accordance with another aspect of the present invention, there is provided a process for fabricating a liquid crystal display panel, comprising the steps of a) preparing a pair of substrate structures having column spacers, b) assembling the substrate structures of the pair in alignment with one another for creating a gap therebetween, c) injecting liquid crystal into the gap, d) evacuating part of the liquid crystal from the gap so a to make a pressure exerted on the inner surfaces of the substrate structures lower than the atmospheric pressure and e) confining the remaining part of the liquid crystal in the gap.

BRIEF DESCRIPTION OF THE DRAWINGS

The features and advantages of the liquid crystal display panel and the process will be more clearly understood from the following description taken in conjunction with the accompanying drawings in which.

DESCRIPTION OF THE PREFERRED EMBODIMENTS

First Embodiment

Figure 5:
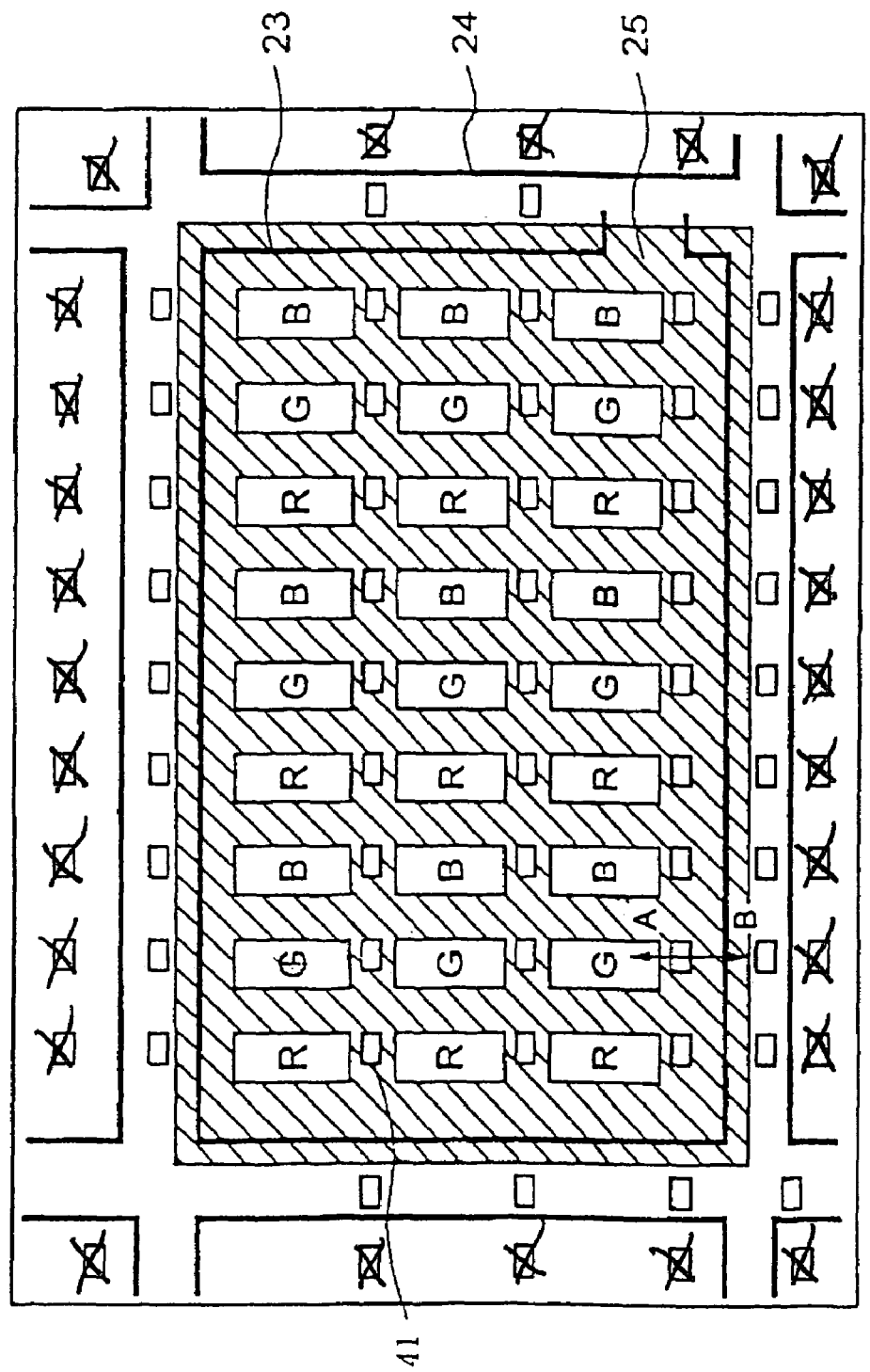
FIG. 5 is a plane view showing the layout of pixels incorporated in a liquid crystal display panel according to the present invention.
Figure 6:
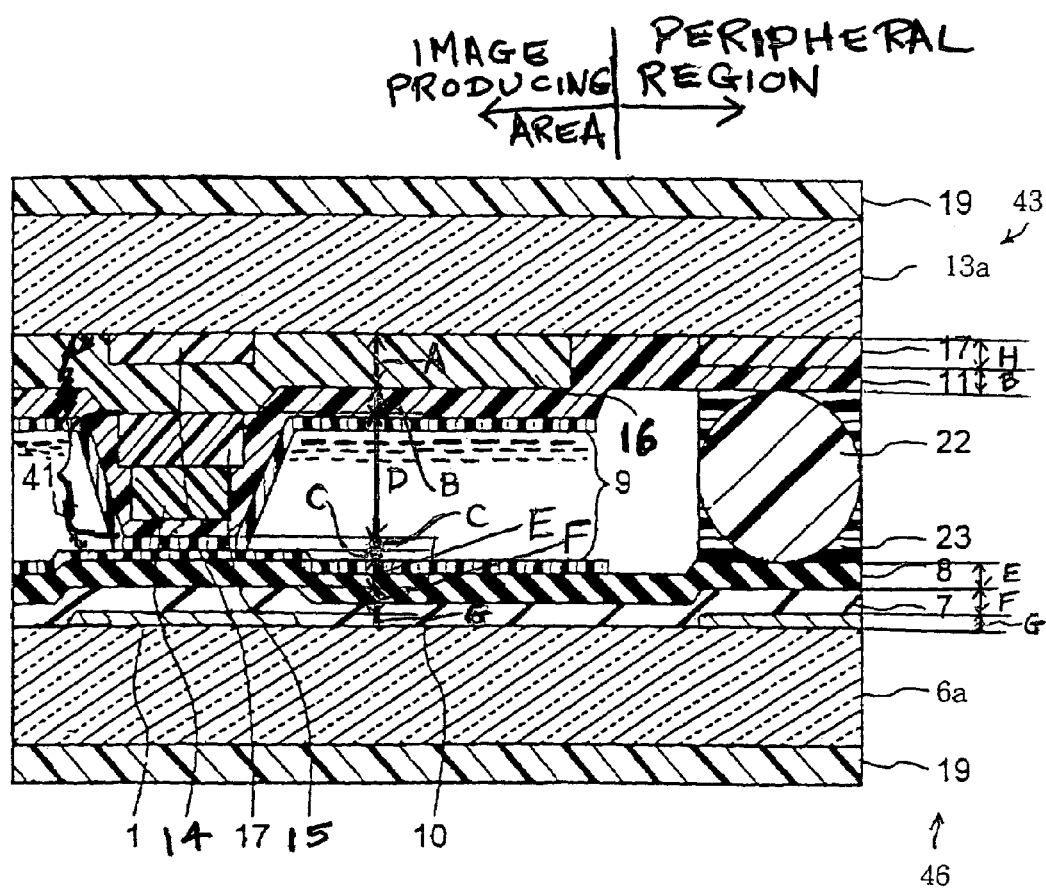
FIG. 6 is a cross sectional view taken along line A-B of FIG. 5 and showing the structure of the liquid crystal display panel.
Figure 7:
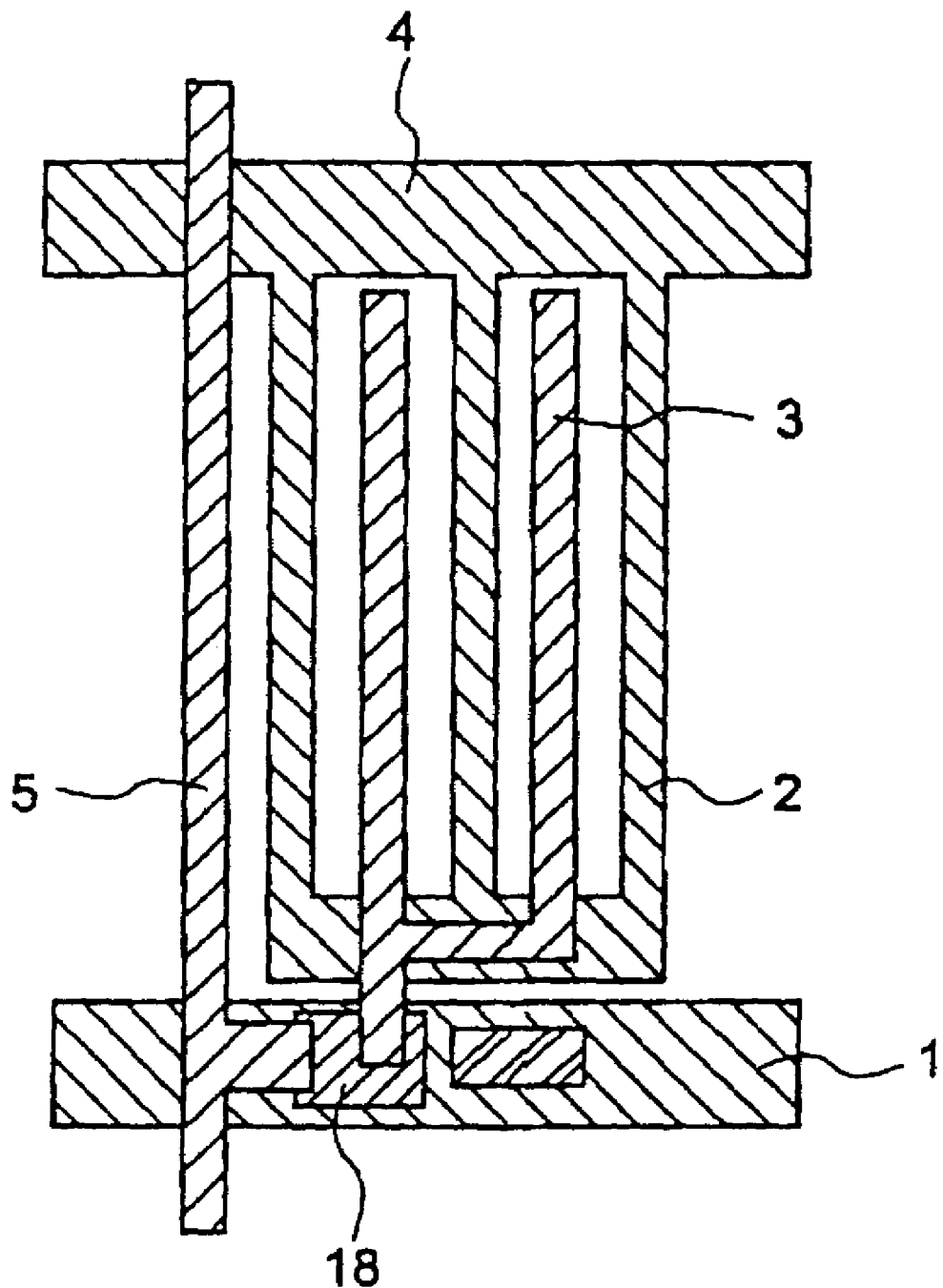
FIG. 7 is a plane view showing the layout of electrodes incorporated in an active matrix substrate structure incorporated in the liquid crystal display panel.

Referring to FIGS. 5, 6 and 7 of the drawings, an LPS liquid crystal display panel embodying the present invention largely comprises an active matrix substrate structure 46, a counter substrate structure 43, a sealing layer 23 and nematic liquid crystal 10. The active matrix substrate structure 46 is opposed to the counter substrate structure 43, and sealing layer 23 creates a gap between the active matrix substrate structure 46 and the counter substrate structure 43. The nematic liquid crystal 10 is injected through an inlet port 25 into the gap, and the gap between the active matrix substrate structure 46 and the counter substrate structure 43 is filled with the liquid crystal 10. Spherical spacers 22 reinforce the sealing resin layer 23, and column spacers 41 keep the gap between the active matrix substrate structure 46 and the counter substrate structure 43 constant. The nematic liquid crystal 10 has the positive anisotropic dielectric constant $\Delta\epsilon$ of 7.0 and anisotropic refractive index $\Delta n$ of 0.070 for 589 nanometers wavelength at 20 degrees in centigrade. As will be better seen in FIG. 5, pixels R, G and B are arranged in rows and columns in the area inside the sealing resin layer 23, and the column spacers 41 are respectively associated with the pixels R/G/B. Although only two column spacers 41 are labeled with reference numeral 41, the same small boxes represent the other column spacers 41. The pixels R, G and B have red filters 45, green filters 16 and blue filters 17, respectively.

Figure 1:
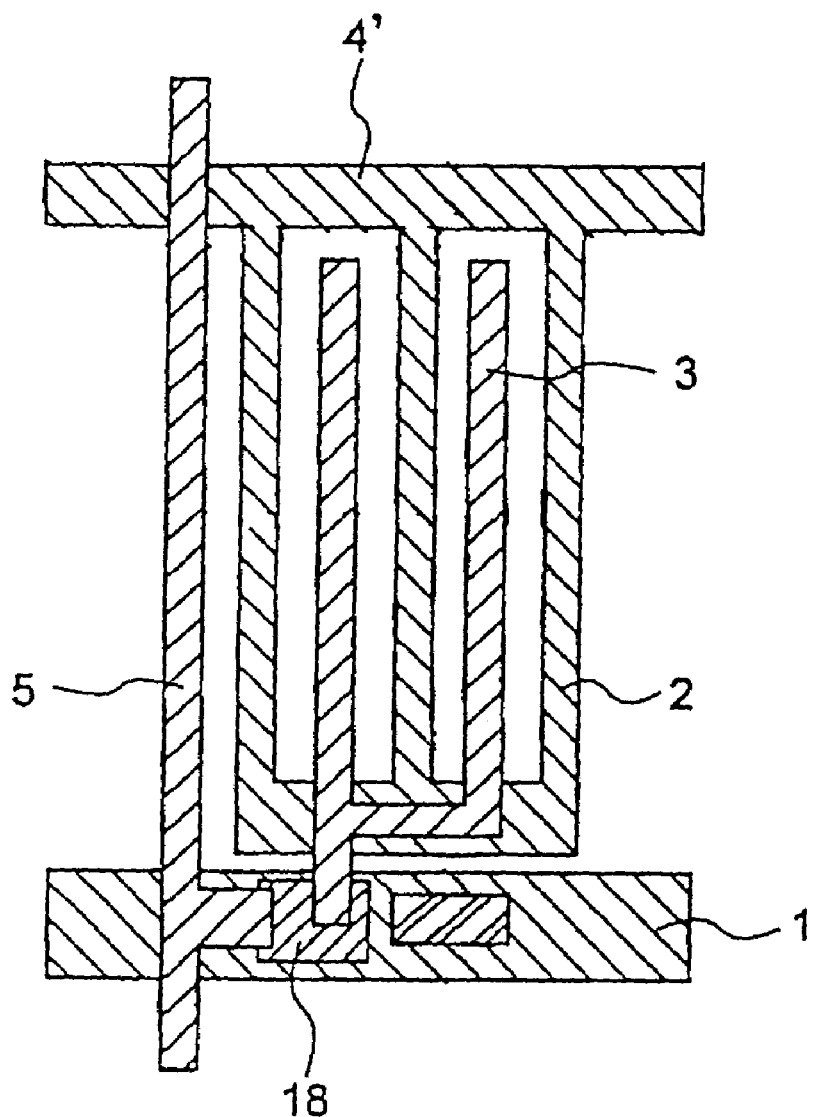
FIG. 1 is a plane view showing the layout of the electrodes of the active matrix substrate structure incorporated in the prior art IPS liquid crystal display panel.
Figure 2:
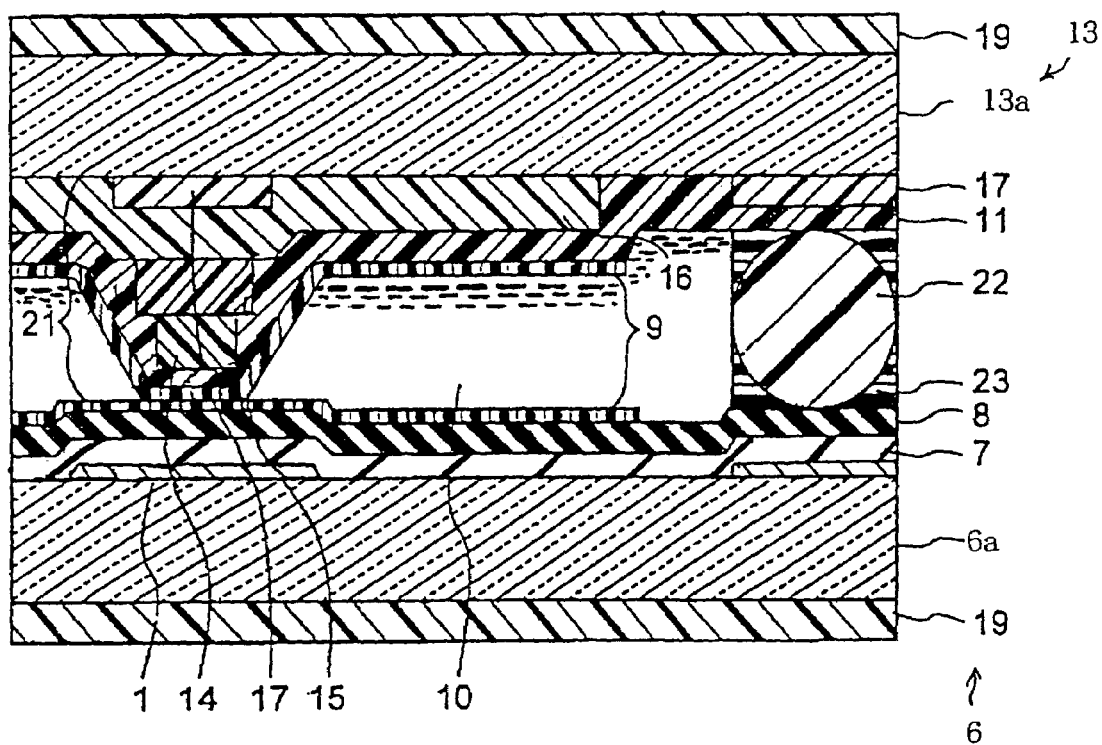
FIG. 2 is a cross sectional view showing the structure of the prior art IPS liquid crystal display panel.

The active matrix substrate structure 46 includes a transparent insulating substrate 6a, a polarizing plate 19, scanning signal lines 1, data signal lines 5, thin film transistors 18, a transparent common electrode 3 and transparent pixel electrodes 2. The transparent insulating substrate 6a is a glass plate, the thickness of which is 1.1 millimeters. The polarizing plate 19 is attached to the outer surface of the transparent insulating substrate 6a, and has the transmitting direction of polarized light identical with that of the prior art LPS liquid crystal display panel. The scanning signal lines 1 and the common electrode 3 are patterned on the inner surface of the transparent insulating substrate 6a (see FIG. 7). Parts of the scanning signal lines 1 serve as gate electrodes of the thin film transistors 18, and the pixel electrode 3 has a comb-like shape. The common electrode 2 is connected to a contact portion 4, and the column spacer 41 is held in contact with an area over the contact portion 4 as will be described hereinbelow. The contact portion 4 is wider than the contact portion 4' of the prior art liquid crystal display panel (see FIG. 1).

The scanning signal lines 1 and the common electrode 3 are covered with a gate insulating layer 7, and the data signal lines 5, semiconductor layers and the pixel electrodes 3 are patterned on the gate insulating layer. The pixel electrode 3 is bifurcated, and has two finger portions. On the other hand, the common electrode 2 assigned to each pixel is separated into three portions, and the pixel electrode 3 is interdigitated with the common electrode 2. The pixel electrode is spaced from the common electrode 2 through the gate insulating layer 7 by 10 microns. The data signal lines 5 are selectively connected to the source electrodes of the thin film transistors 18, and the pixel electrodes 3 are connected to the drain electrodes of the associated thin film transistors 18. The source electrodes and the drain electrodes are held in contact with the semiconductor layers, and each source electrode is spaced from the associated drain electrode on the semiconductor layer. The pixel electrode 2 is partially overlapped with the common electrode 2, and the overlapped portions form a storage capacitor together with the gate insulating layer 7 therebetween.

The thin film transistor 18, the pixel electrode 3 and the associated part of the common electrode 2 are incorporated in each pixel R/G/B, and the pixels R/G/B are arranged at intervals of 270 microns in a direction in which the data signal lines 5 are spaced one another and at intervals of 90 microns in a direction in which the scanning lines 1 are spaced from one another.

The scanning line 1 and the data signal line 5 are shared between the pixels R, G or B of the associated column and between the pixels R, G and B of the associated row, respectively, and the common electrode 2 is shared between the pixels R/G/B of the matrix. The scanning lines 1, the data signal lines 5 and the common are partially widened over the regions each located between the adjacent pixels R/G/B. The wide portions are effective against the line defect. The wide portions of the scanning signal lines 1, the wide portions of the data signal lines 5 and the wide portions of the common electrode 2 are 10 microns wide, 7 microns wide and 7 microns wide, respectively. On the other hand, the finger portions of each pixel electrode 3 and the separated portions of the common electrode 2 are narrowed so as to enhance the aperture ratio, and are 3 microns wide. The data signal lines 5 are 1600×3, i.e., 1600 lines for the pixels R, 1600 lines for the pixels G and 1600 lines for the pixels B. On the other hand, the scanning signal lines 1 are 1200. Thus, 1600×3× 1200 pixels form the pixel array.

The data signal lines 5, the semiconductor layers, the source electrodes, the drain electrodes and the pixel electrodes 3 are covered with a passivation layer 8, and an orientation layer 9 is laminated on the passivation layer 8. The passivation layer 8 is formed of silicon nitride, and the orientation layer 9 is formed of polyimide. The orientation layer 9 is orientated as similar to that of the prior art IPS liquid crystal display panel through the rubbing. Thus, the active matrix substrate structure 46 is similar to the active matrix substrate structure 6 except the area of the contact portion 4.

The counter substrate structure 43 includes a transparent insulating substrate 13a, a polarizing plate 19, a black matrix 17, color filters 14/15/16 and an overcoat layer 11. The polarizing plate 19 is attached to the outer surface of the transparent insulating substrate 13a, and the black matrix and the color filters 14/15/16 are patterned on the inner surface of the transparent insulating layer 13. The color filters 14/15/16 are colored in red, blue and green, respectively, and are partially laminated on the black matrix 17 so as to form the column spacers 41. The column spacers 41 are 4.0 microns high. The column spacers 41 are held in contact with the contact portions 4, respectively, and keep the gap between the active matrix substrate structure 46 and the counter substrate structure 43 constant. The overcoat layer 11 prevents the liquid crystal 10 from the colorant contained in the color filters 14/15/16.

Figure 3:
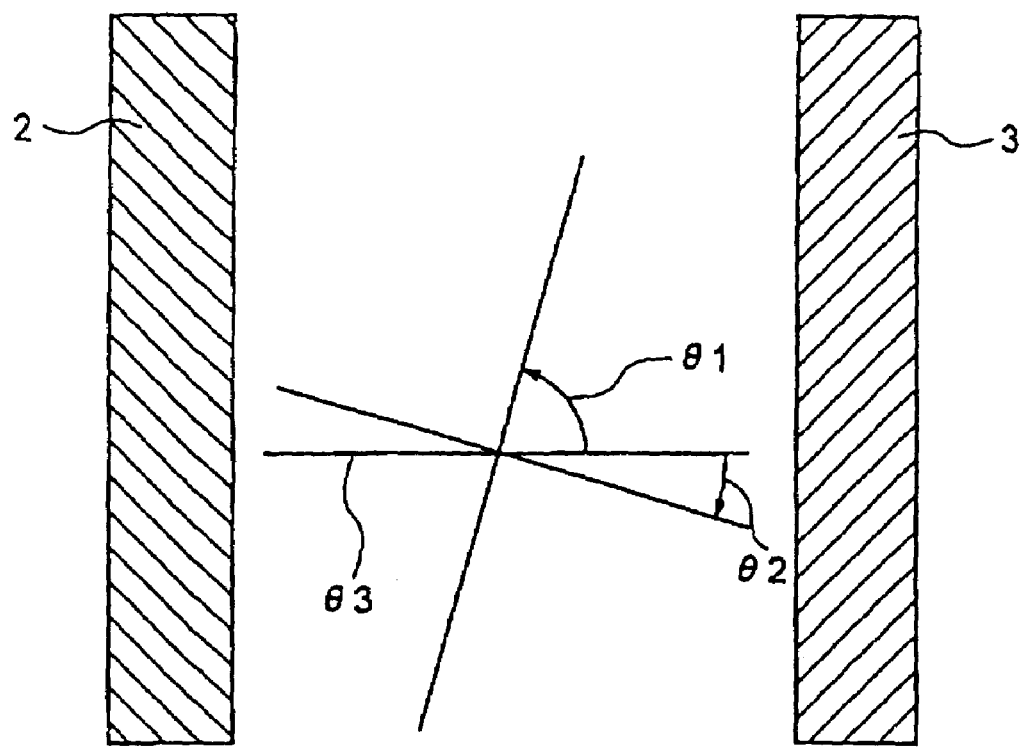
FIG. 3 is a schematic view showing the relation between the orientation layer and the pixel/common electrodes incorporated in the prior art IPS liquid crystal display panel.

The column spacer 41 is held in contact with the area over the contact portion 4 of the gate electrode 1 as shown in FIG. 3. Thus, the column spacers 41 are arranged at the intervals equal to those of the pixels R/G/B within the matrix of the pixels. The column spacers 41 are further provided outside of the matrix of the pixels R/G/B (see FIG. 5), and are located between the sealing layers 23 and between the sealing layer 23 and an auxiliary sealing layer 24. However, any column spacer is not provided in the area assigned to the sealing layers 23/24. If the column spacer 41 is overlapped with the spherical spacer 22, the active matrix substrate structure 46 is widely spaced from the counter substrate structure 43. This is the reason why any column spacer is not provided in the area assigned to the sealing layers 23/24.

The diameter D1 of the spherical spacers 22 is theoretically given as $$D1 = (A+B+2C+D+E+F+G) - H - B - E - F - G = A + D + 2C - H \text{ (micron)} \quad (1)$$

where A is the thickness of the color filter 16 in micron, B is the thickness of the overcoat layer 11 in micron, C is the thickness of the orientation layer 9 in micron, D is the height of the column spacer 41 in micron, E is the thickness of the passivation layer 8 in micron, F is the thickness of the gate insulating layer 7 in micron, G is the thickness of the gate electrode 1 in micron and H is the thickness of the black matrix 17 in micron. The height D is measured from the boundary between the color filter 16 and the overcoat layer 11 to the boundary between the orientation layers 9. In actual products of the IPS liquid crystal display panel, the spherical spacers 22 are partially embedded in the overcoat layer 11 under the black matrix 17, and the spherical spacers 22 are designed in such a manner as to have the diameter D1' equal to or less than (D1+2) microns. Equation (1) is given on the assumption that there is a conductive layer patterned concurrently to the scanning lines 1 under the spherical spacers 22. If the gate insulating layer 7 is directly held in contact with the inner surface of the transparent insulating substrate 6a under the spherical spacers 22, the diameter D2 is given as $$D2 = (A+B+2C+D+E+F+G) - H - B - E - F = A + D + 2C + G - H \text{ (micron)} \quad (2)$$

Even so, the spherical spacers 22 are designed in such a manner as to have the diameter D1' equal to or less than (D1+2) microns.

The polarizing plates 19 have the transmitting directions of polarized light shown in FIG. 3. In this instance, the angle θ1 is 75 degrees, and the angle θ2 is −15 degrees. Thus, the relative relation between the polarizing plates 19 is similar to that of the prior art IPS liquid crystal display panel. The orientation layers 9 were rubbed, and the direction of rubbing on the active matrix substrate structure 46 is substantially in parallel to the direction of rubbing on the counter substrate structure 43, and the direction of rubbing crosses the direction θ3 of electric field at 75 degrees, i.e., θ1.

The IPS liquid crystal display panel is fabricated as follows. Plural active matrix substrate structures 46 and plural counter substrate structures 43 are completed in monolithic structures. The monolithic structures are hereinbelow referred to as "active matrix board" and "counter board". The active matrix board and the counter board are completed by rubbing on the orientation layers 9. After the rubbing step, the sealing layer 23 and 24 are printed on the inner surface of the active matrix board.

Subsequently, the active matrix board is assembled with the counter board by using an aligner (not shown). First, the counter board and the active matrix board are aligned with each other in non-contact state. When the counter board is roughly aligned with the active matrix board, the counter board is assembled with the active matrix board. However, the counter board can not be possibly aligned with the active matrix board due to the impact generated when the counter board is brought into contact with the active matrix board. Finally, the counter board is strictly aligned with the active matrix board in the contact state.

The assemblage and the strict alignment are carried out under pressure so that the sealing layers 23/24 are tightly adhered to the boards. However, if high pressure is exerted on the boards, it is difficult to strictly align the counter board with the active matrix board, because the column spacers 41 do not roll on the active matrix board. If the spacers were spherical, the manufacturer could strictly align the counter board with the active matrix board through the rolling motion of the spherical spacers in spite of the exertion of high pressure. However, the spacers 41 have a column shape, and never roll. This means that the high pressure is undesirable from the viewpoint of the strict alignment. On the other hand, if the pressure is too low, the sealing layers 23/24 are not tightly adhered to the active matrix board or the counter board. Thus, it is necessary to set a limit to the pressure exerted on the boards.

The present inventor investigated the pressure to be exerted on the boards. The present inventor found the appropriate range of the pressure to be equal to or greater than 0.01 $N/m^2$ but equal to or less than 6 $kN/m^2$. The pressure range was appropriate to the assemblage and the strict alignment regardless of the contact area between each column spacer 41 and the active matrix board. If the pressure was fallen within the above range, the strict alignment was smoothly carried out without improper adhesion of the sealing layers 23/24. For this reason, the present inventor concluded that the assemblage and the strict alignment were to be carried out under the pressure fallen within the above range.

After the strict alignment, the sealing layers 23/24 are sintered at appropriate temperature under application of pressure. Then, the sealing layers 23/24 are solidified, and the counter board is fixed to the active matrix board. While the sealing layers are being sintered, the column spacers 41 arranged as shown in FIG. 5 keep the gap constant. If the column spacers 41 are provided only inside the sealing layer 23, the combined boards are partially depressed outside the sealing layers 23, and, accordingly, partially lifted up like a seesaw. This results in irregular gap, and the panels hardly pass the inspection. The column spacers 41 are uniformly provided outside the sealing layers 23 according to the present invention, and the column spacers 41 between the sealing layers 23 prevent the boards from the partial depression.

Subsequently, the combined boards are cut into plural panels, and the nematic liquid crystal 10 is injected from the inlet port 25 into the gap between the active matrix substrate structure 46 and the counter substrate structure 43. After the injection of the nematic liquid crystal 10, the inlet port is plugged. When the nematic liquid crystal 10 is injected into the gap, the IPS liquid crystal display panel slightly bulges out. The IPS liquid crystal display panel is pressed inwardly so as to flow out part of the nematic liquid crystal. Thereafter, a piece of photo-cured resin is inserted into the inlet port 25, and ultra-violet light is radiated to the photo-cured resin. Then, the piece of photo-cured resin is solidified, and the inlet port 25 is plugged.

The evacuation of liquid crystal is effective against the deformation of the IPS liquid crystal display panel operating in the high environment temperature, and the image produced on the display panel is prevented from the irregular brightness due to the descend of the liquid crystal molecules. The internal pressure exerted on the display panel is assumed to be lower than the atmospheric pressure after the evacuation. The liquid crystal display panel is inwardly deformed due to the different between the atmospheric pressure and the internal pressure. Even if the internal pressure is increased together with the environmental temperature, the difference between the atmospheric pressure and the initial internal pressure partially cancels the increase of the internal pressure due to the environmental temperature, and keeps the thickness of the nematic liquid crystal layer 10 unchanged. Thus, the negative initial stress is effective against the deformation of the display panel due to the increase of the environmental temperature.

Finally, the polarizing plates 19 are attached to the outer surface of the counter substrate structure 43 and the outer surface of the active matrix substrate structure 46, respectively.

Scanning signals and data signals are sequentially applied to the IPS liquid crystal display panel for producing a color image. The scanning signals sequentially activate the rows of pixels, and the data signals carry pieces of data information representative of an image to the rows of pixels sequentially activated by the scanning signals. The pixels are normally-black. In other words, if the data signal is at the low level $V_{OFF}$, the lateral electric field keeps the liquid crystal molecules of the pixel in parallel to the direction of rubbing as shown in FIG. 4A, and the liquid crystal molecules and the polarizing plates 19 keep the pixel dark.

Figures 4A, 4B:
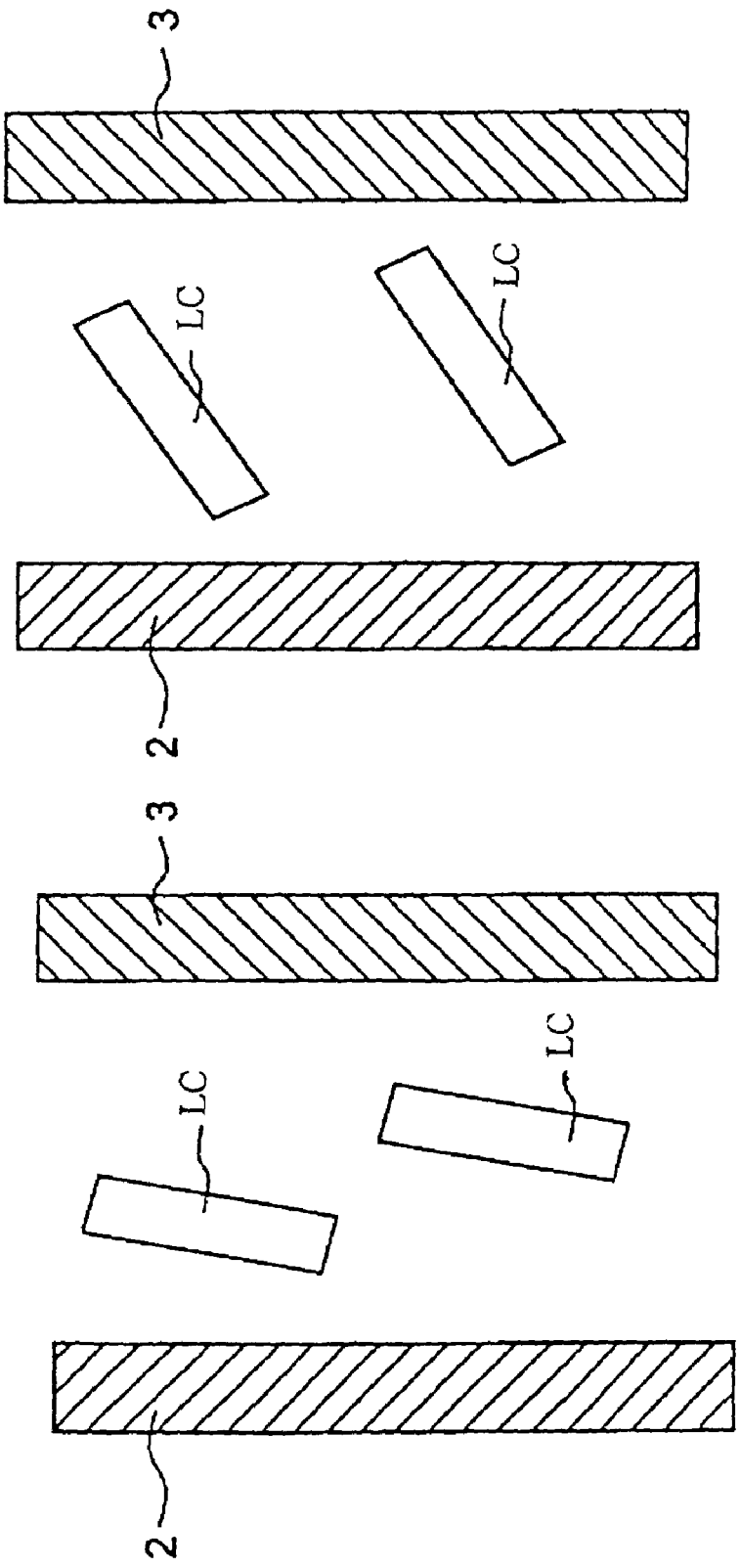
FIGS. 4A and 4B are schematic views showing the liquid crystal molecules under different conditions.

On the other hand, when the data signal is at the high level $V_{ON}$, the electric field is created between the associated pixel electrode and the common electrode applied with the potential level on the non-selected scanning signal line 1, and the electric field directs the liquid crystal molecules at a certain angle with respect to the direction of rubbing as shown in FIG. 4B, the liquid crystal molecules and the polarizing plates 19 make the pixel bright.

Assuming now that the IPS liquid crystal display panel is put in such a manner that a horizontal line is normal to the matrix of pixels, the gravity is exerted on the nematic liquid crystal 10. While the IPS liquid crystal display panel is producing a series of images, the environmental temperature rises, and the temperature rise gives rise to decrease of the friction at the boundary between the orientation layers 9 and the nematic liquid crystal 10. The decrease of the friction is due to the reduction of surface tension of the nematic liquid crystal 10. As a result, the nematic liquid crystal molecules descend toward the lower edge of the display panel. This results in the increase in thickness of the nematic liquid crystal layer 10 along the lower edge of the display panel.

Although the evacuation of nematic liquid crystal 10 is effective against the increase of the thickness as described hereinbefore, the density of column spacers 41 further relates to the deformation of the liquid crystal display panel. The column spacers 41 are expected to support the force exerted on the inner surfaces of the liquid crystal display panel together with the sealing layer 23. If the column spacers 41 is arranged inside the sealing layer at low density, the force is shared between the small number of column spacers 41, and relatively large force is exerted on each of the column spacers 41. This means that the liquid crystal display panel is liable to bulge out. On the other hand, if the column spacers 41 are arranged at high density, the force is shared between the large number of column spacers 41, and relatively small force is exerted on each of the column spacers 41. This means that the liquid crystal display panel is less liable to bulge out.

The present inventor fixed the eyes upon the ratio between the contact area of the column spacer and the occupation area of each pixel. The present inventor fabricated plural samples of the liquid crystal display panel. The samples were different in the contact area between the column spacers 41 and the orientation layer 9 on the active matrix substrate structure. The ratio of the contact area to the occupation area of each pixel R/G/B is varied as indicated by the abscissa (see FIG. 8). First, the present inventor exerted constant pressure to the samples of the liquid crystal display panel, and measured the variation of the gap between the active matrix substrate structure 46 and the counter substrate structure 43. The irregularity of the gap was plotted as indicated by broken lines. Subsequently, the present inventor raised the environmental temperature, and checked the samples to see whether or not the bright spot took place along the lower edge of the display panel. The temperature at which the bright spot was observed was plotted as indicated by real line.

Figure 8:
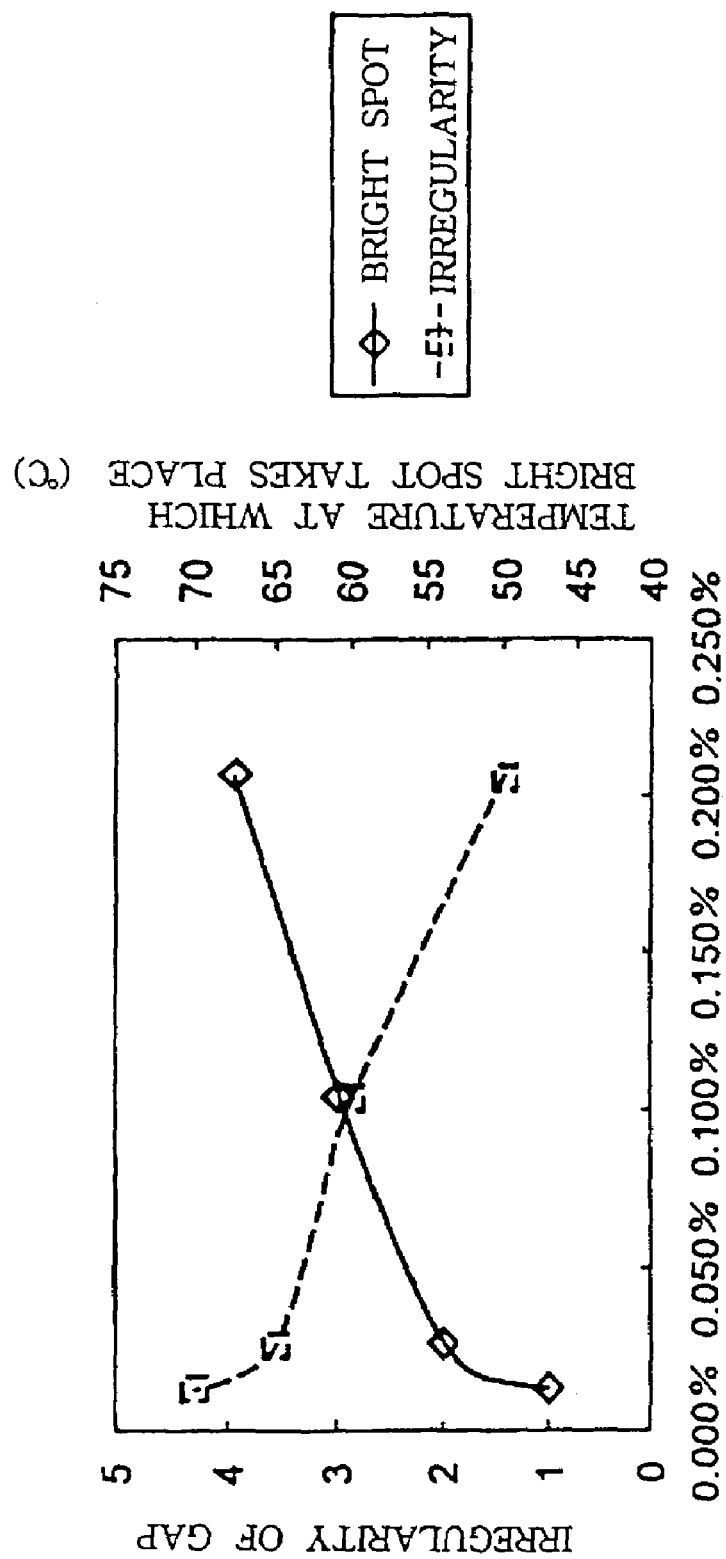
FIG. 8 is a graph showing the relation between a contact area/pixel occupation area and irregularity of gap and the relation between the contact area/pixel occupation area and temperature at which irregularity of brightness takes place.

It is desirable from the viewpoint of the negative initial stress to have a small ratio of the contact area to the occupation area of each pixel (see the broken line in FIG. 8). However, if the ratio is too small, the column spacers 41 can not keep the gap between the active matrix substrate structure 46 and the counter substrate structure 43 constant, and the irregularity of the gap takes place. The irregularity of the gap is causative of a non-uniform image produced on the display panel. On the other hand, it is desirable from the viewpoint of the resistivity against the deformation of the display panel to have a large ratio of the contact area to the occupation area of each pixel (see the real line in FIG. 8). However, if the ratio is too large, the negative initial stress merely cancels small part of the external force exerted on the substrate structures 43/46 due to the decent of the liquid crystal molecules. Thus, a compromise is required.

Although the ratio of 0.100% is optimum, a margin is allowed in commercial products. In the commercial products, the maximum irregularity of gap is to be limited to 2, and the highest temperature is 55 degrees in centigrade. The maximum irregularity of gap sets the lowest limit to the ratio, and the lowest limit is 0.150%. On the other hand, the highest temperature sets the highest limit to the ratio, and the highest limit is 0.050%. Thus, the ratio of the contact area to the occupation area of pixel is to be fallen within the range from 0.050% to 0.150%.

As described hereinbefore, the occupation area of each pixel R/G/B is 270 microns by 90 microns in the IPS liquid crystal display panel implementing the first embodiment. In order to determine the ratio of the contact area to the pixel occupation area to be 0.100%, the contact area is 24.3 square microns. In case where the contact area is square, the contact area measures 5 microns by 5 microns.

As will be understood from the foregoing description, the liquid crystal display panel is prevented from undesirable irregularity of brightness in so far as the ratio of the contact area to the pixel area is fallen within the above-range.

Second Embodiment

Figure 9:
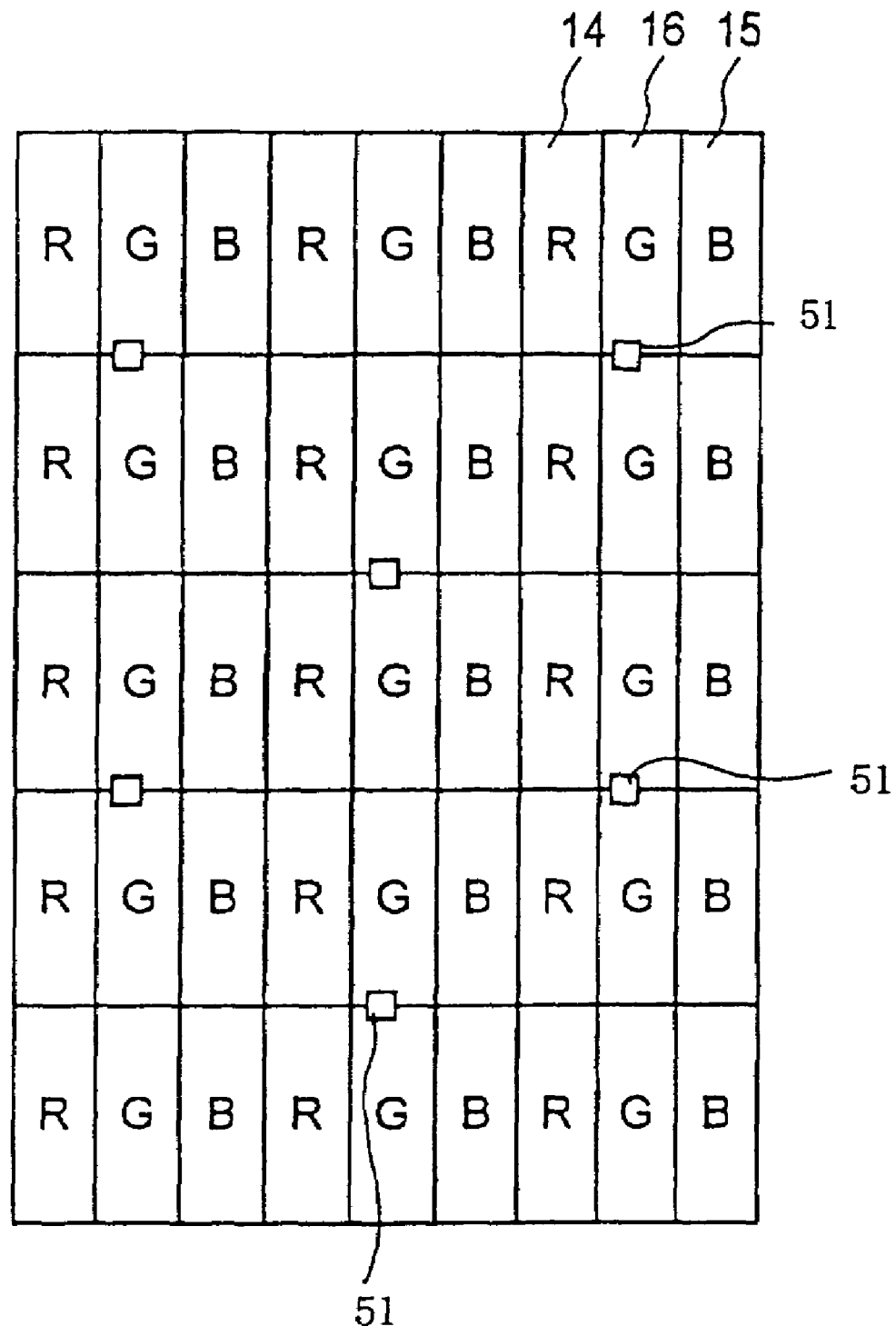
FIG. 9 is a schematic plane view showing the layout of pixels and column spacers incorporated in another liquid crystal display panel according to the present invention.

FIG. 9 illustrates a matrix of pixels R/G/B and column spacers 51 incorporated in another liquid crystal display panel. The IPS technology is employed in the liquid crystal display panel implementing the second embodiment. For this reason, the liquid crystal display panel implementing the second embodiment is similar in structure to the first embodiment except for the layout of the column spacers 51. The color filters 14/16/15 are respectively incorporated in the pixels R/G/B.

The pixels R/G/B are arranged in a matrix, and the column spacers 51 are located in the matrix. Each of the column spacers 51 is associated with plural pixels R/G/B. In this instance, each column spacers 51 is associated with six pixels R/G/B, and is provided at the boundary between the associated two pixels G. As a result, the column spacers 51 are checkerwise arranged. Although the contact area is widened, the ratio of total contact area to total pixel occupation area is fallen within the above-described ratio, i.e., 0.050% to 0.150%. The contact area of each column spacer 51 is six times wider than the contact area of the column spacer 41.

Each pixel R/G/B occupies the area of 270 microns by 90 microns as similar to the pixel of the first embodiment. The six pixels R/G/B occupy the area of 270 microns×90 microns×6. In order to achieve the ratio of 0.01%, by way of example, the associated column spacer 51 is to occupy the area of 146 square microns. In case where the contact area is rectangle, the contact area measures 15 microns by 10 microns.

The IPS liquid crystal display panel implementing the second embodiment achieves all the advantages of the first embodiment by virtue of the ratio fallen within the range. Moreover, the column spacers 51 are so large that the manufacturer can exactly form the column spacers 51 in the matrix of the pixels R/G/B.

Third Embodiment

Figure 10:
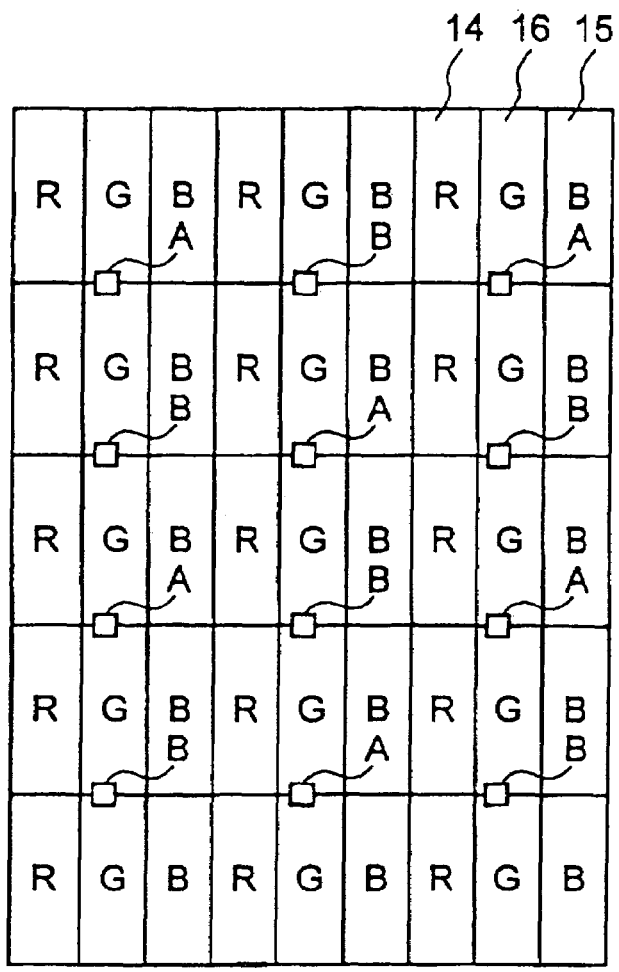
FIG. 10 is a schematic plane view showing the layout of pixels and column spacers incorporated in yet another liquid crystal display panel according to the present invention.

Turning to FIG. 10 of the drawings, pixels R/G/B are arranged in matrix, and column spacers A/B are formed in the matrix of pixels R/G/B. The color filters 14/16/15 are respectively incorporated in the pixels R/G/B, and each of the column spacers A/B are formed at the boundary between adjacent two pixels G. The liquid crystal display panel implementing the third embodiment includes the active matrix substrate structure 46 and a counter substrate structure. The counter substrate structure is similar to the counter substrate structure 43 except the column spacers A/B.

Figures 11A, 11B:
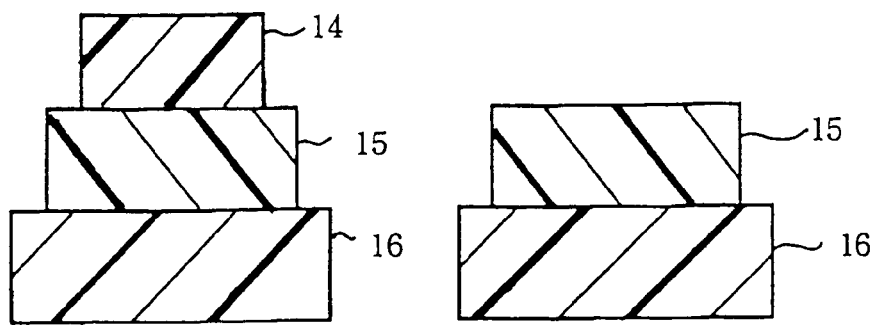
FIGS. 11A and 11B are cross sectional views showing two kinds of column spacers incorporated in the liquid crystal display panel.
Figure 12:
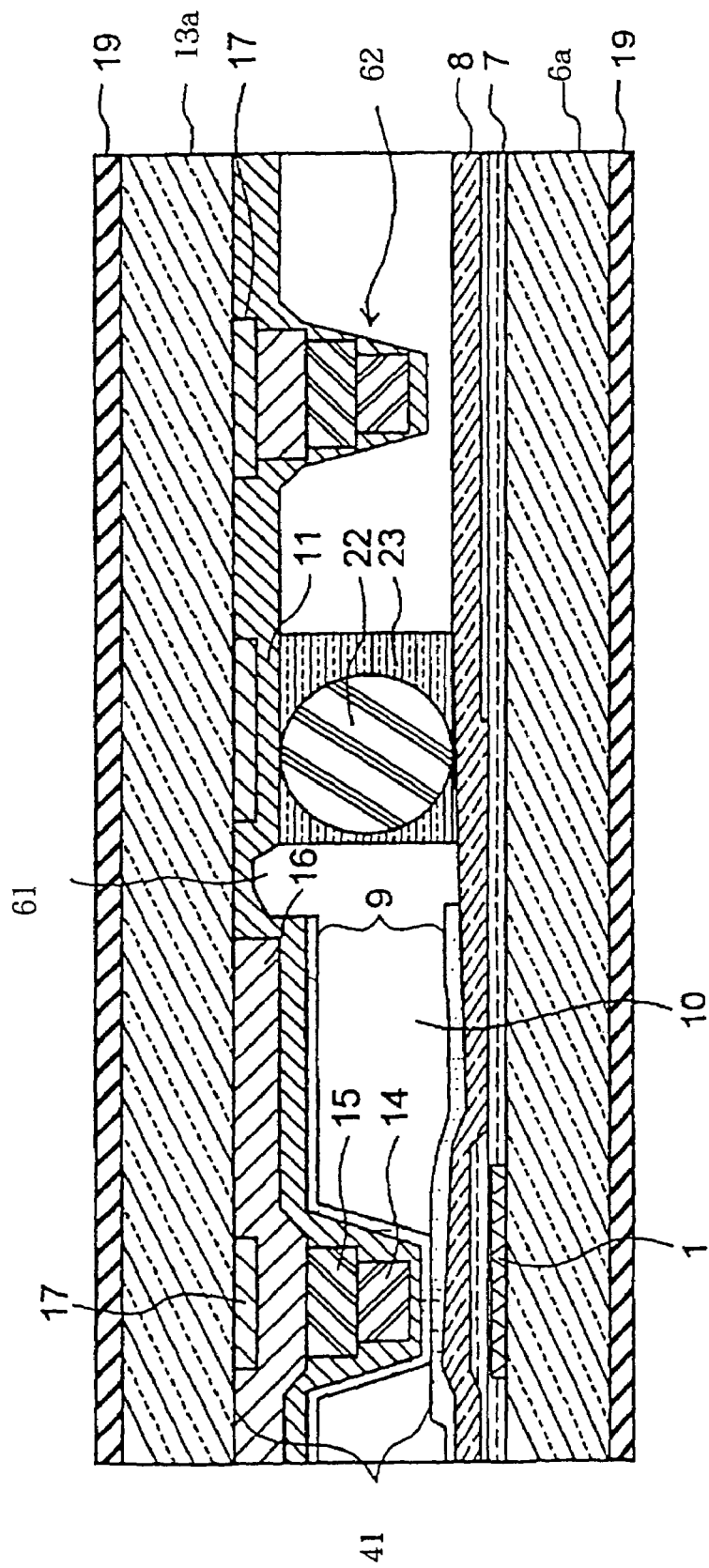
FIG. 12 is a cross sectional view showing the structure of still another liquid crystal display panel according to the present invention.

Although the overcoat layer 11 and the orientation layer 9 are removed from the column spacers A/B, the column spacers A and B have a three-layered structure and a two-layered structure, respectively, as shown in figures 11A and 11B. The column spacers A/B are alternately arranged in the matrix of pixels R/G/B. The column spacers A are identical with the column spacers 41, and are held in contact with the orientation layer 9 of the active matrix substrate structure 46. The column spacers B are shorter than the column spacers A, and are also held in contact with the orientation layer 9. The reason why the column spacers B are alternated with the column spacers A is that the short column spacers B allow the transparent insulating substrates 6a/13a to bend under the exertion of the atmospheric pressure. In detail, when the liquid crystal is partially evacuated from the gap between the active matrix substrate structure 46 and the counter substrate structure, the transparent insulating substrates 6a/13a are liable to bend due to the pressure difference between the atmosphere and the negative internal pressure. The transparent insulating substrates 6a/13a tend to bend due to the thermal stress in the sintering step. In case where the column spacers are spaced at long intervals, the deformation of the transparent insulating substrates 6a/13a is not ignoreable. The short column spacers B set a limit to the deformation of the transparent insulating substrates 6a/13a. As a result, the liquid crystal display panel is free from irregularity of gap due to the excess bend.

The ratio of total contact area to total pixel occupation area is fallen within the range between 0.050% and 0.150%, and the liquid crystal display panel implementing the third embodiment achieves all the advantages of the first embodiment.

Fourth Embodiment

Figure 13:
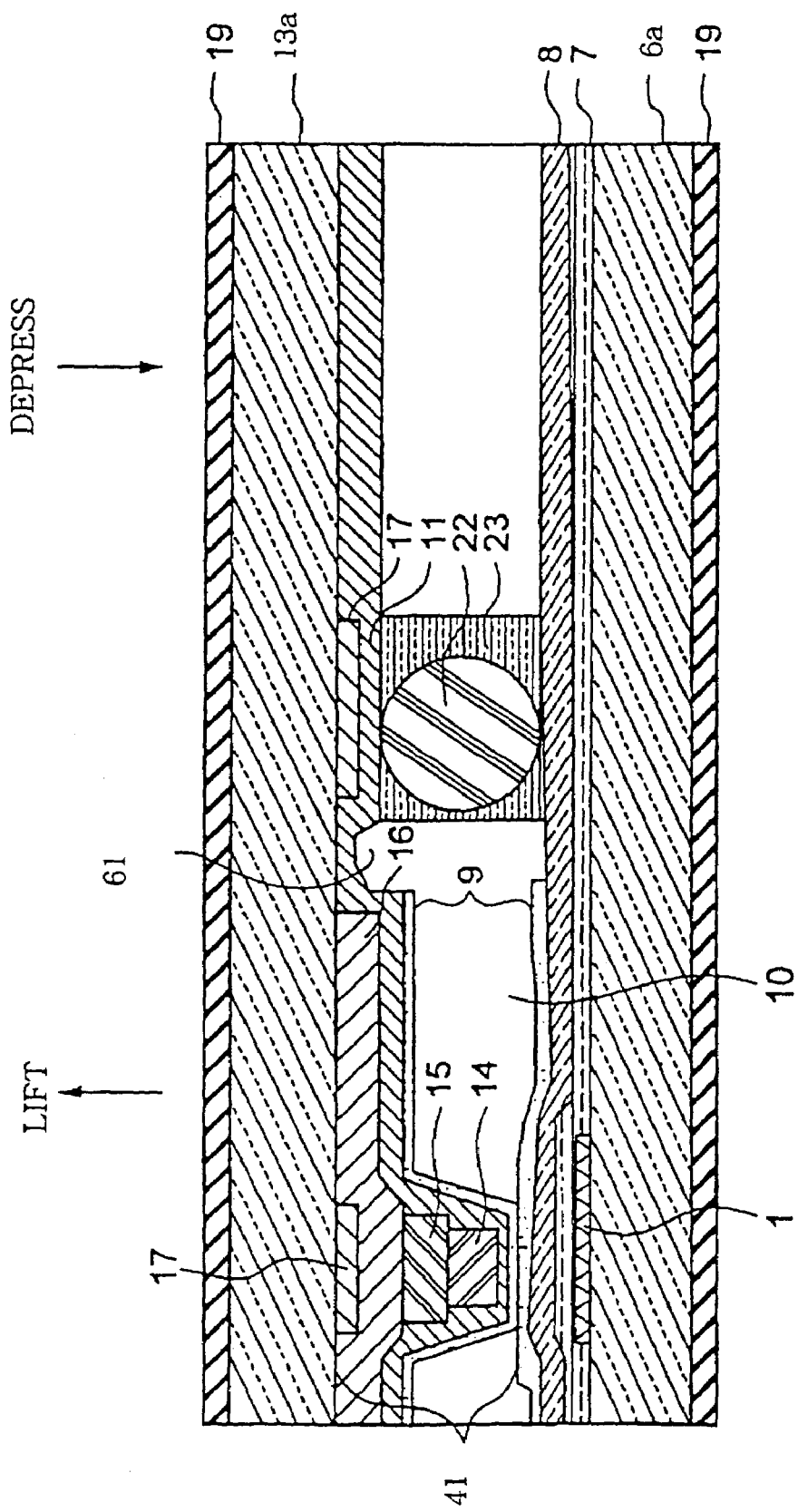
FIG. 13 is a cross sectional view showing the structure of a modification of the liquid crystal display panel.

Yet another liquid crystal display panel embodying the present invention is illustrated in FIG. 13. The liquid crystal display panel implementing the fourth embodiment is similar to the first embodiment, the second embodiment or the third embodiment except a reservoir 61 and column spacers 62 provided outside of the matrix of pixels. Layers, signal lines and spacers incorporated in the fourth embodiment are labeled with the references designating corresponding parts of the first embodiment. Although the column spacers are labeled with 41, the column spacers 41 may be replaced with the column spacers 51 or A/B.

The column spacers 62 are formed outside of the matrix of pixels. As described hereinbefore in connection with the first to third embodiments, if the total contact area is too wide, the column spacers keep the gap between the active matrix substrate structure and the counter substrate structure constant in spite of the evacuation step, and the irregular brightness takes place at relatively low environmental temperature. On the other hand, if the ratio is fallen within the range, the liquid crystal display panel does not bulge out in the low environmental temperature, and produces fine images. However, the liquid crystal display panel may be warped. For example, if a person gives the liquid crystal display panel a poke, the liquid crystal display panel is temporarily deformed, and displayed image is also deformed. In order to prevent the liquid crystal display panel from the temporary deformation, the column spacers 62 are provided outside the sealing layer 23. The column spacers 62 set a limit to the deformation. The column spacers 62 may be formed at the four corners of the liquid crystal display panel.

The reservoir 61 is effective against the decent of liquid crystal molecules. Even though the liquid crystal molecules are liable to be decent at high environmental temperature, the reservoir takes up the liquid crystal molecules, and prohibits the liquid crystal molecules from making the display panel partially bulge out.

One of the column spacers 62 and the reservoir 61 may be employed in a liquid crystal display panel according to the present invention. FIG. 13 illustrates a modification of the fourth embodiment where only the reservoir 61 is formed.

As will be appreciated from the foregoing description, the ratio fallen within the range between 0.050% and 0.150% is effective against the irregular brightness due to the decent of the liquid crystal molecules at high environmental temperature.

Although particular embodiments of the present invention have been shown and described, it will be apparent to those skilled in the art that various changes and modifications may be made without departing from the spirit and scope of the present invention.

For example, an overcoat layer may be partially removed for forming column spacers.

The present invention is applicable to another kind of liquid crystal display panel. For example, the column spacers 41, 51 or A/B may be formed on the active matrix substrate structure together with color filters.

The column spacers 51 may be checkerwise located at the boundary between the associated two pixels R or between the associated two pixels B.

Similarly, the column spacers A/B may be located at the boundary between the pixels R or between the pixels B.

What is claimed is:

1. A liquid crystal display panel comprising:
    a pair of substrate structures having plural pixels where an image is produced,
    liquid crystal filling a gap between said pair of said substrate structures and selectively making said pixels dark and bright for producing said image,
    column spacers formed on one of said substrate structures of said pair and held in contact with the other of said substrate structures, the ratio of the total contact area between said column spacers and said other of said substrate structures to the total area occupied by said plural pixels being within the range from 0.050 percent to 0.150 percent, at least one of said column spacers being formed within a matrix of said plural pixels, said matrix of said plural pixels being formed by rows and columns of said plural pixels, and
    a sealing layer formed between said matrix of said plural pixels and a peripheral area, and
    a reservoir formed between said substrate structures for preventing said pair of substrate structures from increasing said gap by accumulating part of said liquid crystal,
    wherein no column spacers are formed in an area of said sealing layer, and
    wherein the liquid crystal display panel is an In-Plane-Switching display panel.

2. The liquid crystal display panel as set forth in claim 1, in which said column spacers are respectively associated with said pixels.

3. The liquid crystal display panel as set forth in claim 2, in which said column spacers are formed in one of said substrate structures, and switching transistors, pixel electrodes respectively connected to said switching transistors and a common electrode are incorporated in the other of said substrate structures.

4. The liquid crystal display panel as set forth in claim 3, further comprising a sealing layer formed around said plural pixels and reinforced with spacers.

5. The liquid crystal display panel as set forth in claim 4, in which said spacers are spherical and have a diameter expressed as $$DM=(A+B+2C+D+E+F+G)-H-B-E-F-G=A+D+2C-H$$

where DM is the diameter of said spacers in micron, A is a thickness of color filters formed on said one of said substrate structures in micron, B is a thickness of an overcoat layer covering said color filters in micron, C is a thickness of orientation layers respectively covering said overcoat layer and a passivation layer over said switching transistors and said pixel electrodes in micron, D is a height of said column spacers in micron, E is a thickness of said passivation layer in micron, F is a thickness of a gate insulating layer forming parts of said switching transistors in micron, G is a thickness of gate electrodes forming other parts of said switching transistors in micron and H is a thickness of a black matrix covered with said color filters in micron.

6. The liquid crystal display panel as set forth in claim 5, in which an actual diameter of said spacers is equal to or less than the sum of said diameter DM and 2 microns.

7. The liquid crystal display panel as set forth in claim 1, further comprising additional column spacers formed outside said matrix of said plural pixels, said additional column spacers being formed in said peripheral area.

8. The liquid crystal display panel as set forth in claim 1, in which each of said column spacers is associated with pixels selected from said plural pixels.

9. The liquid crystal display panel as set forth in claim 8, in which said column spacers are classified into two groups one of which is taller than the other of said two groups.

10. The liquid crystal display panel as set forth in claim 8, further comprising additional column spacers formed outside said matrix of said plural pixels, said additional column spacers being formed in said peripheral area.

11. The liquid crystal display panel as set forth in claim 1, in which said liquid crystal exerts a pressure lower than the atmospheric pressure on the inner surfaces of said substrate structures while any electric power is not applied thereto in room temperature.

12. The liquid crystal display panel as set forth in claim 1, wherein:
the reservoir is integrally formed between said substrate structures; and
the reservoir is adapted to accept a part of said liquid crystal from between said pair of substrate structures to prevent increasing said gap.

13. The liquid crystal display panel as set forth in claim 12, wherein the reservoir is adapted to accept a part of said liquid crystal from between said pair of substrate structures to prevent increasing said gap during a period of one of high external temperature and local direct pressure.

14. A process for fabricating a liquid crystal display panel, comprising the steps of:
a) preparing a pair of substrate structures having column spacers;
b) assembling the substrate structures of said pair in alignment with one another for creating a gap therebetween, the assembled substrate structure providing a reservoir between said substrate structures for preventing said pair of substrate structures from increasing said gap by accumulating part of said liquid crystal;
c) injecting liquid crystal into said gap;
d) evacuating part of said liquid crystal from said gap so as to make a pressure exerted on the inner surfaces of said substrate structures lower than the atmospheric pressure; and
e) confining the remaining part of said liquid crystal in said gap, in which said column spacers formed in one of said substrate structures are held in contact with the other of said substrate structures for creating said gap, and the ratio of total contact area between said column spacers and said other of said substrate structures to the area occupied by pixels is within the range between 0.050% to 0.150%, at least one of said column spacers being formed within a matrix of said pixels, said matrix of said pixels being formed by rows and columns of said pixels,
wherein no column spacers are formed in an area of a sealing layer formed between said matrix of said plural pixels and a peripheral area, and
wherein the liquid crystal display panel is an In-Plane-Switching display panel.

15. The process for fabricating a liquid crystal display panel as set forth in claim 14, in which pressure ranging from 0.01 N/m$^2$ to 6 kN/m$^2$ is applied to said substrate structures in said step b).

16. The process for fabricating a liquid crystal display panel as set forth in claim 14, in which said step b) includes the sub-steps of:
b-1) roughly aligning said substrate structures in non-contact state,
b-2) bringing said substrate structures into contact with one another, and
b-3) exactly aligning said substrate structures with one another under application of pressure ranging from 0.01 N/m$^2$ to 6 kN/m$^2$.

17. The process as set forth in claim 14, in which force is exerted on said substrate structures for evacuating said part of said liquid crystal in said step d).

18. The process as set forth in claim 14, wherein:
the reservoir is integrally formed between said substrate structures; and
the reservoir is adapted to accept a part of said liquid crystal from between said pair of substrate structures to prevent increasing said gap.

19. The process as set forth in claim 14, wherein the reservoir is integrally formed between said substrate structures; and, wherein the reservoir is adapted to accept a part of said liquid crystal from between said pair of substrate structures to prevent increasing said gap during a period of one of high external temperature and local direct pressure.

* * * * *